United States Patent
Klinefelter et al.

(10) Patent No.: US 10,654,062 B2
(45) Date of Patent: May 19, 2020

(54) IRRIGATION SYSTEM

(71) Applicant: IRRIGREEN, INC., Edina, MN (US)

(72) Inventors: Gary Klinefelter, Eden Praire, MN (US); Jeffrey B. Woodson, Prior Lake, MN (US)

(73) Assignee: Irrigreen, Inc., Edina, MN (US)

( * ) Notice: Subject to any disclaimer, the term of this patent is extended or adjusted under 35 U.S.C. 154(b) by 172 days.

(21) Appl. No.: 15/746,476

(22) PCT Filed: Jul. 15, 2016

(86) PCT No.: PCT/US2016/042511
§ 371 (c)(1),
(2) Date: Jan. 22, 2018

(87) PCT Pub. No.: WO2017/015118
PCT Pub. Date: Jan. 26, 2017

(65) Prior Publication Data
US 2018/0207661 A1    Jul. 26, 2018

Related U.S. Application Data

(60) Provisional application No. 62/195,597, filed on Jul. 22, 2015.

(51) Int. Cl.
*B05B 12/08* (2006.01)
*A01G 25/16* (2006.01)
(Continued)

(52) U.S. Cl.
CPC ........... *B05B 12/085* (2013.01); *A01G 25/16* (2013.01); *B05B 1/16* (2013.01); *B05B 1/30* (2013.01);
(Continued)

(58) Field of Classification Search
CPC ........... B05B 1/16; B05B 1/30; B05B 12/082; B05B 12/085; B05B 12/087;
(Continued)

(56) References Cited

U.S. PATENT DOCUMENTS

| 4,530,465 A | 7/1985 | Gauchet et al. |
| 4,714,635 A | 12/1987 | Mochizuki et al. |

(Continued)

FOREIGN PATENT DOCUMENTS

| GB | 2087566 | 5/1982 |
| WO | 2012012318 A3 | 1/2012 |

(Continued)

OTHER PUBLICATIONS

International Search Report and Written Opinion of PCT/US2016/042511, dated Oct. 25, 2016.

*Primary Examiner* — Darren W Gorman
(74) *Attorney, Agent, or Firm* — Brian D. Kaul; Westman, Champlin & Koehler, P.A.

(57) ABSTRACT

An irrigation system includes a valve that controls the flow of water through a sprinkler head, and a flow sensor that measures the water flow rate through the sprinkler head. In some embodiments, the valve is adjusted until the flow sensor measures a water flow rate that matches a first predetermined water flow rate. This is a first position for the valve. The valve opening is adjusted again by a set amount or until the flow sensor measures a water flow rate that matches a second predetermined water flow rate. This is a second position for the valve. The first and second predetermined water flow rates each correspond to a throw distance the water stream discharged from the sprinkler head will travel. This relationship between the water flow rate and distance is based on empirical data for the sprinkler. A second equation relating the valve opening to water flow rate, for a given pressure, is then used to estimate the water (Continued)

effective pressure. In some embodiments, the first and second valve positions and the first and second water flow rates are used to estimate the effective pressure using the second equation.

6 Claims, 9 Drawing Sheets

(51) Int. Cl.
    *B05B 1/30*      (2006.01)
    *B05B 1/16*      (2006.01)
    *G05B 19/042*      (2006.01)
    *B05B 3/02*      (2006.01)

(52) U.S. Cl.
    CPC .............. *B05B 3/02* (2013.01); *B05B 12/082* (2013.01); *G05B 19/042* (2013.01); *B05B 12/087* (2013.01); *G05B 2219/2625* (2013.01)

(58) Field of Classification Search
    CPC .... B05B 12/124; A01G 25/16; G05B 19/042; G05B 2219/2625
    See application file for complete search history.

(56) References Cited

U.S. PATENT DOCUMENTS

| | | |
|---|---|---|
| 5,475,614 A | 12/1995 | Tofte et al. |
| 2013/0126635 A1 | 5/2013 | Klinefelter et al. |
| 2014/0131469 A1 | 5/2014 | Henry et al. |

FOREIGN PATENT DOCUMENTS

| | | | |
|---|---|---|---|
| WO | WO-2013151724 A1 | * | 10/2013 |
| WO | 2017015118 A1 | | 1/2017 |

* cited by examiner

IRRIGATION SYSTEM

CROSS-REFERENCE TO RELATED APPLICATION

This Application is a Section 371 National Stage Application of International Application No. PCT/US2016/042511, filed Jul. 15, 2016 and published as WO 2017/015118 A1 on Jan. 26, 2017, in English, which claims the benefit of U.S. Provisional Application Ser. No. 62/195,597, filed Jul. 22, 2015 under 35 U.S.C. § 119(e), the contents of which are hereby incorporated by reference in their entirety.

BACKGROUND

Irrigation sprinklers are known for watering circular patterns or arc segments of a circular pattern. Typical irrigation sprinklers discharge a single rotary water stream that is rotated in a circle around a vertical rotational axis. This water stream is thrown by a sprinkler nozzle mounted in the peripheral sidewall of the nozzle head at an upward angle relative to the horizontal to direct the water a radial distance from the nozzle.

Irrigation systems generally comprise multiple sprinklers within multiple watering zones. Each sprinkler is recessed within the ground and is fed water through underground pipes. An irrigation controller activates a zone by opening a valve that controls the flow of water through the pipes of the zone. The irrigation controller activates the zones sequentially for a predetermined period of time based on zone program instructions.

Irrigation sprinklers currently have several drawbacks. The most significant is that they spray water in circles that are overlapped between sprinklers in order to conform to complex landscape shapes. This causes excess water to be deposited in the areas where these sprinklers overlap. In many systems 50% excess water is used.

Another drawback to conventional irrigation sprinklers is that they use only a few nozzles or nozzle openings. One drawback is that some nozzles spray a fine mist close to the sprinkler which results in water evaporation due to the small droplet size. Another drawback is that some of the nozzles must water a large annular ring around the sprinkler which results in watering that is not uniform across the annular ring (i.e., in a radial direction from the nozzle). As a result, these conventional sprinklers waste water and are inflexible to landscape variations.

Irrigation systems have been disclosed that comprise, for example, a computer server with one or more wireless networks, one or more computerized sprinklers with a digitally controlled valve connected by wire to the server, one or more controllers with Wi-Fi plus another wireless network and one or more flow sensors connected by wire to the controller. Exemplary irrigation systems are disclosed in International Patent Application Serial No. PCT/US2011/044337, filed Jul. 18, 2011, and U.S. patent application Ser. No. 13/744,588, filed Jan. 18, 2013. The above referenced patent applications are incorporated herein by reference in their entirety. In these irrigation systems, each sprinkler provides a uniform incremental amount of precipitation to the soil for each revolution and can also adjust the incremental amount for a given arc portion of a revolution. In one embodiment the server and controller are combined and in another embodiment they are separate thereby creating more flexibility.

The systems must be properly calibrated to provide the desired watering pattern including the throw distance the watering stream travels from the sprinkler head over various arc portions of a revolution. Furthermore, it has been determined that a consistent pressure and flow are desirable to maintain efficiency where efficiency is defined by the system using the desired amount of water. Too much pressure causes too much flow resulting in over-watering and a throw distance that is too long, and too little pressure causes too little flow resulting in under-watering and a throw distance that is too short.

An installation contractor may use a pressure gauge to measure static pressure, but that does not account for working pressure loss under flow conditions in pipes and fittings in the field. The contractor can also turn on the sprinkler and measure the distance of the streams which are reflective of the flow conditions under working pressure, but this has proven to be complicated and slows down the installation. There is a need for automatically finding the effective pressure for a particular irrigation sprinkler and setting the sprinkler distance at a particular installation site.

SUMMARY

Embodiments of the invention are directed to an irrigation system and method that automatically calibrates the system for achieving a desired water flow rate that results in a desired throw distance for the watering streams discharged by the sprinkler heads. In some embodiments, the system includes a valve that controls the flow of water through a sprinkler head, and a flow sensor that measures the water flow rate through the sprinkler head. In some embodiments, the valve is adjusted until the flow sensor measures a water flow rate that matches a first predetermined water flow rate. This is a first position for the valve. The valve opening is adjusted again by a set amount or until the flow sensor measures a water flow rate that matches a second predetermined water flow rate. This is a second position for the valve. The first and second predetermined water flow rates each correspond to a throw distance the water stream discharged from the sprinkler head will travel. This relationship between the water flow rate and distance is based on empirical data for the sprinkler. A second equation relating the valve opening to water flow rate, for a given pressure, is then used to estimate the water effective pressure. In some embodiments, the first and second valve positions and the first and second water flow rates are used to estimate the water effective pressure using the second equation.

Some embodiments of the invention are directed to a rotary sprinkler and a sprinkler system that may be calibrated using the method described above. In some embodiments, the rotary sprinkler comprises a plurality of nozzles, each of which comprises a fluid pathway including a central axis, an inlet, an outlet, a length measured from the inlet to the outlet along the central axis, and an interior diameter at the outlet. In one embodiment, the rotary sprinkler comprises three or more nozzles. In one embodiment, the rotary sprinkler comprises 4-7 nozzles. In one embodiment, the rotary sprinkler comprises 8-12 nozzles.

In some embodiments, the plurality of nozzles are configured to discharge water streams at different radial distances from the sprinkler to form concentric watering rings when the nozzles are rotated about a vertical axis. In some embodiments, each of the nozzles has a different interior diameter at the outlet. In accordance with some embodiments, each of the nozzles has a different length. In some embodiments, each of the nozzles is oriented at a different angle relative to the ground. In some embodiments, each of the nozzles has a different interior diameter at the outlet, a different length and/or is oriented at a different angle relative to the ground.

In some embodiments, the rotary sprinkler comprises first, second and third nozzles. The first nozzle comprises a first nozzle fluid pathway including a central axis, an inlet, an outlet, a first length measured from the inlet to the outlet along the central axis, and a first interior diameter at the outlet. The second nozzle comprises a second nozzle fluid pathway including a central axis, an inlet, an outlet, a second length measured from the inlet to the outlet along the central axis, and a second interior diameter at the outlet. The third nozzle comprises a third nozzle fluid pathway including a central axis, an inlet, an outlet, a third length measured from the inlet to the outlet along the central axis, and a third interior diameter at the outlet. In some embodiments, the first interior diameter is greater than the second interior diameter, and the second interior diameter is greater than the third interior diameter. In some embodiments, the first length is greater than the second length, and the second length is greater than the third length.

In some exemplary embodiments, the second length is approximately 65-85% of the first length, and the third length is 65-85% of the second length. In some embodiments, the first length is 1.7-2.83 inches, the second length is 1.25-2.09 inches, and the third length is 0.92-1.54 inches. Adjustments may be made to the lengths depending on the water pressure and the radial distance to be covered by the sprinkler. Thus, in some embodiments, the lengths are longer for higher water pressures and longer water throw distances.

In some embodiments, the second interior diameter is approximately 70-90% of the first interior diameter, and the third interior diameter is 70-90% of the second interior diameter. In some embodiments, the first interior diameter is 0.125-0.185 inches, the second interior diameter is 0.096-0.144 inches, and the third interior diameter is 0.075-0.122 inches. In some embodiments, the interior diameters are enlarged for higher water pressure and to throw more water longer distances. For example, to cover a radial distance of approximately 80 feet, the first diameter is approximately 0.250-0.370 inches, the second diameter is approximately 0.192-0.288 inches and the third diameter is approximately 0.150-0.244.

In some embodiments, the central axis at the outlet of the first nozzle fluid pathway is oriented at a first angle relative to a horizontal plane, which is perpendicular to the vertical axis, the central axis at the outlet of the second nozzle fluid pathway is oriented at a second angle relative to the horizontal plane, and the central axis at the outlet of the third nozzle fluid pathway is oriented at a third angle relative to the horizontal plane. In some embodiments, the first angle is greater than the second angle, and the second angle is greater than the third angle.

In some embodiments, the rotary sprinkler comprises a nozzle head that supports the first, second and third nozzles. In one embodiment, the rotary sprinkler comprises a base that supports the nozzle head. In some embodiments, the rotary sprinkler comprises a drive mechanism that drives rotation of the nozzle head about a vertical axis relative to the base. In some embodiments, the drive mechanism comprises a motor configured to drive the rotation of the nozzle head about the vertical axis.

In some embodiments, the first nozzle body is configured to discharge a first water stream a first distance, the second nozzle body is configured to discharge a second water stream a second distance, which is less than the first distance, and the third nozzle body is configured to discharge a third water stream a third distance, which is less than the second distance. This allows the rotary sprinkler to water concentric rings around the rotary sprinkler.

In some embodiments, the first, second and third output streams respectively produce first, second and third elliptical spray patterns. In one embodiment, the first elliptical spray pattern overlaps a distal portion of the second elliptical spray pattern, and the second elliptical spray pattern overlaps a distal portion of the third elliptical spray pattern.

In some embodiments, the rotary sprinkler comprises a main water inlet configured to receive a flow of water from a water supply line and a fluid flow path connecting the main water inlet to the inlets of the first, second and third nozzles.

In some embodiments, the rotary sprinkler comprises a valve configured to control a flow of water through the fluid flow path responsive to signals received from a controller. In some embodiments, the rotary sprinkler comprises a motor configured to move the valve between opened, closed and intermediary positions.

In some embodiments, the rotary sprinkler comprises a plurality of valves, each configured to control a flow of water to one or more of the nozzles. In one embodiment, the rotary sprinkler comprises one or more motors configured to move the plurality of valves between opened, closed and intermediary positions. In some embodiments, the fluid flow path comprises a first fluid flow path connecting the water inlet to the inlet of the first nozzle, a second fluid flow path connecting the water inlet to the inlet of the second nozzle, and a third fluid flow path connecting the water inlet to the inlet of the third nozzle. In some embodiments, the rotary sprinkler comprises a first valve configured to control a flow of water through the first fluid flow path responsive to signals received from a controller, a second valve configured to control a flow of water through the second fluid flow path responsive to signals received from a controller, and a third valve configured to control a flow of water through the third fluid flow path responsive to signals received from a controller.

In some embodiments, the rotary sprinkler comprises a sensor that generates a signal indicative of a pressure in the fluid flow path, or a flow rate of a water flow through the fluid flow path.

In some embodiments, a pressure regulator in the fluid flow path.

In some embodiments, the fluid flow paths of each of the nozzles comprise a straight cylindrical section extending from the outlet to an intermediary location between the inlet and the outlet of the nozzle fluid pathway, and a curved section extending from the inlet to the intermediary location.

In some embodiments, the rotary sprinkler comprises a controller that is located within the sprinkler. In some embodiments, the controller comprises one or more processors configured to execute program instructions stored in memory to perform one or more method steps or functions described herein. In some embodiments, the controller is configured to set a position of the one or more valves of the rotary sprinkler to opened, closed and intermediary positions. In some embodiments, the controller is configured to receive output signals from the sensor. In some embodiments, the controller receives control signals from a system controller located remotely from the rotary sprinkler.

In some embodiments, the rotary sprinkler comprises a power supply. In one embodiment, the power supply is rechargeable.

In some embodiments, the base of the rotary sprinkler comprises a sealed compartment in which electrical components of the rotary sprinkler are contained. In some embodiments, the electrical components comprise one or more motors, a controller, one or more processors, a power supply, and/or electrical circuitry.

Some embodiments of the sprinkler system comprise a plurality of rotary sprinklers, an irrigation controller and a system or sprinkler controller. Embodiments of the rotary sprinklers include one or more embodiments described herein. In one embodiment, the rotary sprinklers each comprise a water supply inlet, a nozzle head supported by a base, and a plurality of nozzles supported by the nozzle head. The nozzles each comprise a fluid pathway having an inlet and an outlet. A fluid flow path connects the water supply inlet to the inlets of the nozzles. In some embodiments, the sprinklers each comprise at least one valve configured to control the flow of water through the fluid flow path. In some embodiments, the irrigation controller comprises memory containing zone program instructions, and a processor configured to execute the zone program instructions and generate zone valve signals based on the zone program instructions. In some embodiments, the system controller comprises memory containing sprinkler program instructions, and a processor configured to execute the sprinkler program instructions and communicate control signals to the at least one valve of each of the rotary sprinklers based on the sprinkler program instructions and the zone valve signals.

In some embodiments, each of the rotary sprinklers comprises a rechargeable power supply coupled to the at least one valve. In some embodiments, the system controller provides power to the power supply over a control line.

In some embodiments, the control signals comprise valve settings, and each of the rotary sprinklers sets a position of the at least one valve responsive to the valve settings.

In some embodiments, the system comprises a sensor configured to produce a sensor output indicative of a measured pressure or water flow rate, and the system controller generates the valve settings based on the sensor output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
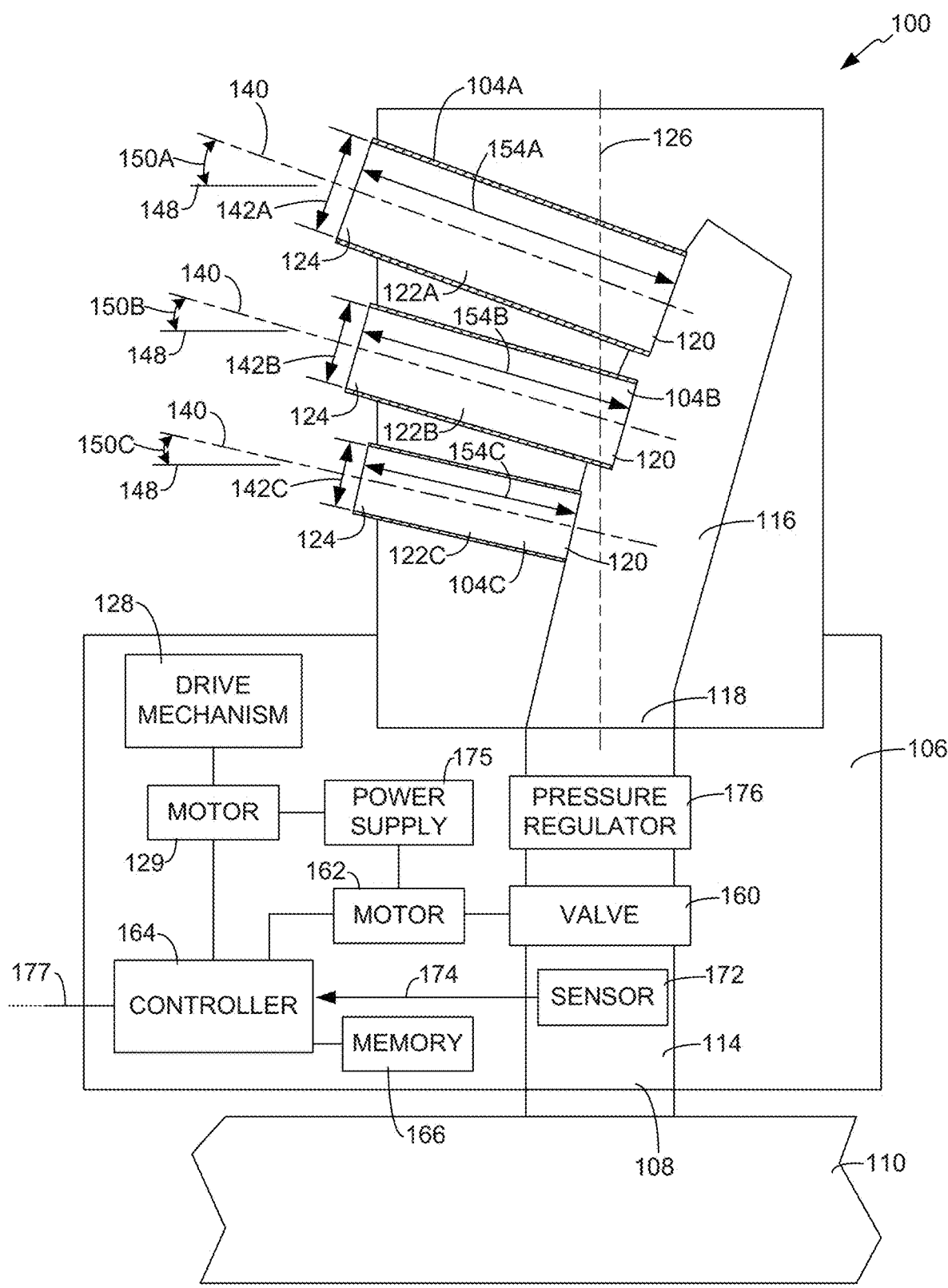
FIG. 1 is a schematic diagram of a rotary sprinkler in accordance with embodiments of the invention.

Embodiments of the invention are directed to multi-nozzle rotary sprinklers, sprinkler systems and methods. Elements depicted in the drawings having the same or similar reference correspond to the same or similar element.

FIG. 1 is a schematic diagram of a rotary sprinkler 100 in accordance with embodiments of the invention. The rotary sprinkler 100 generally comprises a nozzle head 102, a plurality of nozzles, each generally referred to as 104, and a base 106. The base 106 provides support for the nozzle head 102. The nozzle head 102 supports the plurality of nozzles 104, such as nozzles 104A-C.

While the exemplary sprinkler 100 is illustrated as including 3 nozzles 104, embodiments of the sprinkler include two or more nozzles. In one embodiment, the sprinkler 100 includes three or more nozzles. In one embodiment, the sprinkler 100 includes 4-7 nozzles or 8-12 nozzles.

The rotary sprinkler 100 includes a water supply inlet 108 that may be coupled to a water supply line 110, such as a hose or in-ground piping. The water supply line 110 provides a pressurized source of water that is delivered to the nozzles 104 through a fluid flow path of the sprinkler 100. The fluid flow path comprises a section 114 through the base 106 and a section 116 through the nozzle head 102. The fluid flow path section 114 of the base 106 extends from the water supply inlet 108 to an inlet 118 of the nozzle head 102. The fluid flow path section 116 of the nozzle head 102 extends from the inlet 118 to inlets 120 of the nozzles 104. Each of the nozzles 104 includes a fluid pathway, generally referred to as 122, that fluidically couples the inlet 120 to an outlet 124. Accordingly, water supplied by the water supply line 110 passes through the water supply inlet 108 of the rotary sprinkler 100, the fluid flow path section 114 of the base 106, the fluid flow path section 116 of the nozzle head 102 and the fluid pathway 122 of the nozzles 104 where it is discharged through the outlet 124 of the nozzles 104 and directed to the watering area.

In one embodiment, the nozzle head 102 is configured to rotate about a vertical axis 126 relative to the base 106. In one embodiment, the rotary sprinkler 100 includes a drive mechanism 128 that is configured to drive the rotation of the nozzle head 102 about the axis 126 relative to the base 106. In one embodiment, the drive mechanism 128 comprises a motor 129, such as an electric motor or a hydraulic motor, that drives the rotation of the nozzle head 102 relative to the base 106 through a suitable gear arrangement.

In accordance with one embodiment, the rotary sprinkler 100 is designed for use as an in-ground sprinkler. In one embodiment, the base 106 is buried within the ground and the nozzle head 102 is configured to telescope out of the base 106 to a raised position when water pressure is applied to at least the inlet 118 of the nozzle head 102 for performance of a watering operation. When the water pressure is removed, the nozzle head 102 recedes within the base 106 to a lowered position, in which it is generally located at or just below the turf or grass. In one embodiment, the nozzle head 102 is biased toward the lowered position using, for example, a spring. The spring holds the nozzle head 102 within the base 106 until sufficient water pressure is applied to the inlet 118.

In one embodiment, the rotary sprinkler 100 is configured for above-ground watering operations. In accordance with this embodiment, the base 106 provides sufficient support for the nozzle head 102 such that the nozzle head 102 is maintained in a vertical orientation during the watering operation. It is not necessary for the nozzle head 102 to recede within the base 106 in this embodiment.

Figure 2:
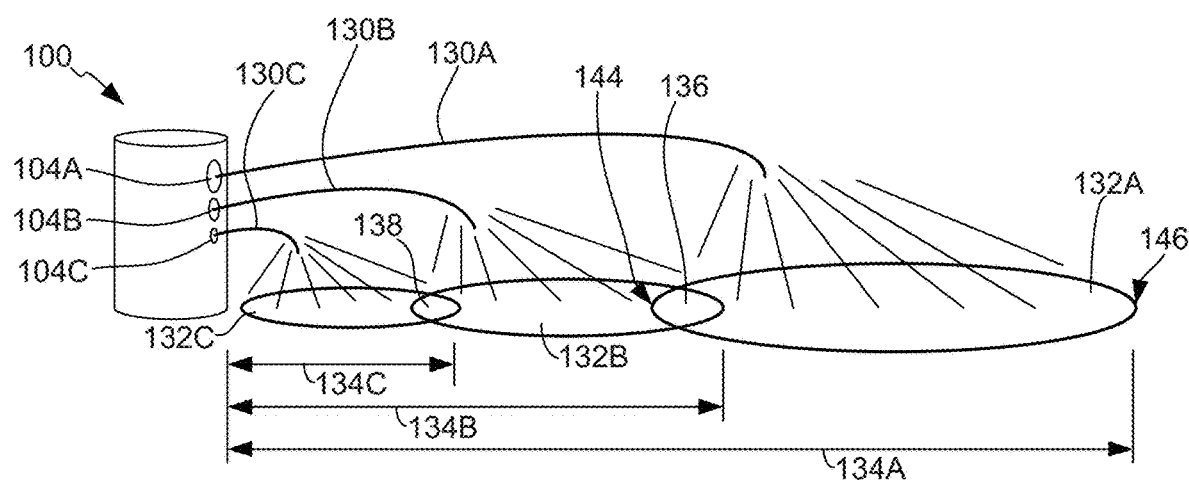
FIG. 2 is a simplified drawing illustrating exemplary water streams from a rotary sprinkler in accordance with embodiments of the invention.

In one embodiment, each of the nozzles 104 is configured to discharge a water stream to a different watering area or target site than the other nozzles 104 of the rotary sprinkler 100. This allows the sprinkler 100 to produce concentric watering rings as the nozzle head 102 is rotated about the vertical axis 126. FIG. 2 is a simplified drawing illustrating exemplary water streams, each generally referred to as 130, from the rotary sprinkler 100 in accordance with embodiments of the invention. The watering streams 130 fall on watering areas, generally referred to as 132, located on the ground or other target.

In one embodiment, nozzle 104A is configured to discharge water stream 130A that falls on a watering area 132A that extends to a radial distance 134 for a given water pressure at the inlet 120 of the nozzle 104A. Nozzle 104B is configured to discharge a water stream 130B to a watering area 132B that extends to a radial distance 134A from the rotary sprinkler 100. Likewise, nozzle 104C is configured to discharge a water stream 130C that falls on a watering area 132C that extends to a radial distance 134C from the sprinkler 100. In one embodiment, the radial distance 134A is greater than the radial distance 132B, which is greater than the radial distance 132C.

In one embodiment, the watering areas 132A, 132B and 132C only partially overlap each other. For instance, the watering area 132A covered by the water stream 130A overlaps only a distal portion 136 of the watering area 132B. Similarly, the watering area 132B of the water stream 130B overlaps only a distal portion 138 of the watering area 132C of the water stream 130C. As a result, each of the water streams 130 produced by the plurality of nozzles 104 of the rotary sprinkler 100 are configured to water an annular ring around the sprinkler 100 as the nozzle head 102 is rotated about the vertical axis 108 relative to the base 106 that does not significantly overlap the annular watering areas covered by the other nozzles 104.

The resultant concentric watering rings allow for uniform watering per unit length in the radial direction from the sprinkler 100 as compared to single nozzle sprinklers. Another advantage is that when the system water flow or pressure is adjusted, a proportional change in the watering pattern occurs.

In one embodiment, the water streams 130 do not produce as much spray as single nozzle sprinklers of the prior art. In one embodiment, the watering areas 132 covered by each of the water streams 130 are approximately elliptical, as illustrated in FIG. 2. This has the advantage of reducing water loss through evaporation into the air, resulting in more efficient watering of the targeted area.

The radial distance the streams 130 discharged by the nozzles 104 travel from the sprinkler 100 depends on various nozzle parameters. These include the diameter of the outlet 124, the length of the fluid pathway 122 and the angle of the nozzle 104 relative to the horizontal plane (i.e., the ground). The resultant streams 130 also depend on the water pressure at the inlet 120.

In one embodiment, each of the nozzles 104 has a central axis 140 that extends along the fluid pathway 122, as shown in FIG. 1. While the fluid pathway 122 is illustrated as a straight tubular section in FIG. 1, the fluid pathway 122 may also be curved, as described below. The central axis 140 generally extends through the center of the straight and/or curved sections of the fluid pathway 122 of each nozzle 104.

In one embodiment, the fluid pathway 122 has an interior diameter measured in a plane that is perpendicular to the central axis 140. In accordance with one embodiment, the fluid pathway 122 has a uniform interior diameter. In accordance with another embodiment, the fluid pathway 122 has a non-uniform interior diameter.

In one embodiment, each of the nozzles 104 has a different interior diameter, generally referred to as 142, at the outlet 124. In one embodiment, the nozzles 104 having watering areas 132 located farther from the sprinkler 100 have larger diameters than the nozzles 104 having watering areas 132 located more closely to the sprinkler 100. Thus, in one embodiment, the exemplary rotary sprinkler 100 illustrated in FIG. 1, nozzle 104A has an interior diameter 142A that is larger than the interior diameter 142B of the nozzle 104B. In accordance with another embodiment, the interior diameter 142B of the nozzle 104B is larger than the interior diameter 142C of the nozzle 104C.

In one embodiment, the interior diameters 142 of the nozzles 104 are set based on the expected water pressure at the water supply inlet 108 and the radial distance from the rotary sprinkler 100 where the desired watering area 132 is located. In one embodiment, the interior diameters of each of the nozzles 104 are set to produce streams 130 that produce watering areas 132 that form concentric rings around the rotary sprinkler 100 when the nozzle head 102 is rotated 360 degrees during a watering operation.

In one embodiment, the selection of the interior diameters 142 of the nozzles 104 is made based on an expected pressure at their inlets 120 and the desired maximum radial distance from the sprinkler 100 that is to be watered. For instance, using a pressure of 40 psi, a single nozzle radius of 0.125 inches can discharge a water stream a distance of 40 feet when the volumetric flow rate of the water at the inlet 120 is approximately 7 gallons per minute. In one embodiment, this overall radius is used to determine the outlet diameter settings for multiple nozzles such that concentric rings of watering areas may be produced.

In one embodiment, the outlet diameters 142 of the plurality of the nozzles 104 are computed based on this single nozzle radius determination. In general, the single nozzle radius is divided into a plurality of nozzles 104 where the sum of the radii of the plurality nozzles 104 is equal to the single nozzle radius. The nozzles can then be used to discharge the water to distinct radial distances and form a set of concentric ring watering areas.

In one exemplary embodiment, for 100 psi of pressure and a water flow rate of approximately 36 gallons per minute at inlet 120, an overall radius of 0.25 is used to calculate multiple nozzles where the maximum desired distance is 80 feet.

Once the radius of the single nozzle is determined, such as that mentioned above, we can use that radius to determine the radii of proportionately smaller nozzles. In one embodiment, this is accomplished by selecting the nozzles 104 such that the sum of all their cross-sectional areas conforming to radii of $k*r(n)$ is made to be equal to the area of the selected single nozzle, where k is a nozzle proportion factor. In accordance with one embodiment, k is within the range of 0.70-0.90 or 70-90%. In accordance with another embodiment, k is within the range of 0.70-0.80 or 70-80%. In accordance with another embodiment, k is within the range of 0.75-0.79 or 75-79%. In accordance with another embodiment, k is within the range of 0.77-0.78 or 77-78%. In one embodiment, k is 0.78.

As a result, in one embodiment, the interior diameter 142B of the nozzle 104B at its outlet 124 is determined by multiplying the interior diameter 142A at its outlet 124 by the proportion factor k. The interior diameter 142C of the nozzle 104C at its outlet 124 is then determined by multiplying the interior diameter 142B at the outlet 124 by the proportion factor k. For example, a single nozzle having a radius of 0.125 inches may be modeled as ten separate nozzles. For k=0.78, the largest nozzle will have a radius of approximately 0.77 inches and the smallest will have a radius of approximately 0.008 inches. Practical considerations like nozzle clogging may need to be considered for small nozzle sizes. As a result, a minimum radius, such as 0.0125 inches, may need to be set for some of the smaller nozzles.

In order to select an appropriate nozzle proportion factor k, the watering ring size for any given nozzle must be known. The watering ring size for a given nozzle is the radial distance between the proximal edge 144 and the distal edge 146 of the watering area 132 for a given pressure at the inlet 120, as shown in FIG. 2 for watering area 132A. This has been measured empirically and modeled as 117 times the radius in feet for one embodiment. For the 0.077 inch radius nozzle outlet 124, the watering ring size is 9 feet from the proximal edge 144 to the distal edge 146. For a maximum range of 40 feet, this means the 0.077 radius nozzle waters a ring from 31 to 40 feet under full pressure. Likewise, each successive nozzle can be set to water another ring inside the previous one. Taking 0.077 times 0.78 yields the next nozzle radius of approximately 0.06 inches. Taking 0.06 times 117 yields a ring size of 7 feet for the next ring. Thus, the second nozzle waters from 24 to 31 feet. The table provided below lists an exemplary set of 11 nozzles that may be used to generate concentric watering rings that cover a radial distance of 40 feet from the rotary nozzle 100 based on a water pressure of 40 psi.

| Watering Ring Range (feet) | Nozzle Radius (inches) |
| --- | --- |
| 40-31 | 0.0770 |
| 31-24 | 0.0600 |
| 24-18.5 | 0.0468 |
| 18.5-14.2 | 0.0365 |
| 14.2-10.7 | 0.0298 |
| 10.7-8 | 0.0233 |
| 8-5.8 | 0.0185 |
| 5.8-4.1 | 0.0146 |
| 4.1-2.6 | 0.0125 |
| 2.6-1.3 | 0.0125 |
| 1.3-0 | 0.0125 |

In one embodiment, after the appropriate nozzles have been selected, trajectory angles for each nozzle can be computed based on expected water velocity, nozzle height above the ground and the desired radial distance of the watering area to be covered by the nozzle. In one embodiment, the trajectory angle 150 for each nozzle is determined by the orientation of the central axis 140 relative to a horizontal plane 148 extending perpendicularly to the vertical axis 126, about which the nozzle head 102 is configured to rotate.

In one embodiment, each of the nozzles of the rotary sprinkler 100 has a different trajectory angle, generally referred to as 150. In one embodiment, the trajectory angle 150 of the nozzle 104 that is configured to have the farthest reaching output stream 130 (e.g., nozzle 104A) has the largest trajectory angle 150. In one embodiment, this trajectory angle 150 is approximately 30-45 degrees. In one embodiment, nozzles 104 responsible for directing water streams 130 to shorter radial distances from the rotary sprinkler 100 have lower trajectory angles 150 than nozzles 104 that are responsible for generating water streams 130 that travel larger radial distances from the sprinkler 100. Accordingly, in one embodiment, nozzle 104A has a trajectory angle 150A, nozzle 104B has a trajectory angle 150B and nozzle 104C has a trajectory angle 150C, as shown in FIG. 1.

The length of each of the nozzles 104 determines the stream 130 that is discharged by the nozzle. If the nozzle 104 is too short, the stream breaks up upon exit of the nozzle 104 thereby limiting the distance the stream can travel. If the nozzle 104 is too long, the pressure drop across the nozzle 104 slows the velocity of the water flow through the nozzle, which can also prevent the stream 130 from reaching a desired radial distance from the rotary sprinkler 100. In one embodiment, the nozzles 104 are each configured to have water flows through the nozzles 104 that travel at approximately the same velocity for a given pressure.

In one embodiment, the length of each nozzle 104, generally referred to as 154, corresponds to the length of the central axis 140 measured from the inlet 120 to the outlet 124, as shown in FIG. 1. In one embodiment, the lengths 154 of the nozzles 104 are approximated using Darcy's formula (Equation 1), where $\Delta p$ is the pressure drop across the nozzle 104 due to friction in the fluid pathway 122, $\rho$ is the density of water, f is a friction coefficient, L is the pipe length 154, v is the water flow rate, D is the internal pipe diameter, and Q is the volumetric flow rate of the water.

$$\Delta p = \frac{\rho * f * L * v^2}{2D} = \frac{8\rho * f * L * Q^2}{\pi^2 D^5} \qquad \text{Eq. 1}$$

For desired pressure drop across the nozzle 104 based on the static versus dynamic pressure of the system, a length of the fluid pathway 122 for a particular nozzle 104 is computed for a specific output velocity (e.g., approximately 39 feet per second). In this situation the largest nozzle is the longest and the most likely to produce an irregular flow if it is too short. The length 154 of the fluid pathway 122 of the nozzle needs 104 to be long enough so that the flow reaches a turbulent state. If the length 154 is less than this critical length, the flow through the nozzle 104 will be irregular. Lengths 154 that are greater than this critical length, reduces the velocity of the water that is ejected from the nozzle 104. For instance, a nozzle radius of 0.077 inches requires a length 154 of approximately 2.26 inches in order to work in a system providing 40 psi of dynamic pressure. Shorter lengths 154 will not produce the desired 40 foot radial distance due to irregular flow in the nozzle 104, and longer lengths 154 will reduce the radial distance the stream 130 can travel due to velocity reduction in the fluid pathway 122. Longer lengths 154 also reduce the size of the watering area 132. Once the exit velocity for the largest nozzle 104 has been computed, the lengths 154 of the remaining nozzles 104 can be computed given the same pressure drop (e.g., 12.5 psi) and velocity. In this way, all nozzle streams 130 exit at a similar velocity and the trajectory angle 150 can be used to determine the radial distance the stream 130 travels from the rotary sprinkler 100.

Due to the turbulent flow in the fluid pathway 122, each of the streams 130 break up into droplets as the stream travels from the outlet 124 to the targeted watering area 132. This creates an elliptical pattern on the ground that forms the watering area 132. The watering pattern 132 varies in proportion to the water flow that travels through the nozzle 104. This allows for the formation of shorter and longer sets of concentric watering rings.

In one embodiment, the stream 130 discharged from the nozzle 104 responsible for the watering area 132 located closest to the sprinkler 100 is diffused by a modification to the outlet 124, which may include a curved member in the fluid flow path leading up to the outlet 124 resulting in a taller outlet and a reduction in the outlet width resulting in watering area 132 having a longer and more narrow elliptical pattern compared to the nozzles 104 that lack the modification. Alternatively, a nozzle 104 may be configured to generate a spray pattern to cover the ground adjacent the sprinkler 100.

In one embodiment, the rotary sprinkler 100 includes a valve 160 that controls the flow of water through the fluid flow paths 114 and 116 of the sprinkler 100, as shown in FIG. 1. In one embodiment, the valve 160 has a closed position, in which water is prevented from flowing along the fluid flow paths, and an opened position, in which water is free to travel along the fluid flow paths. In one embodiment, the valve 160 also includes intermediary positions that allow the flow rate of the water through the fluid flow path to be set to a value that is less than the maximum flow rate achieved when the valve 160 is in the fully opened position. As a result, the valve 160 may be used to adjust the flow rate of the water through the fluid flow path 112 to be set to the desired level. This allows for greater control over the streams 130 produced by the nozzles 104 and their watering areas 132.

In one embodiment, the position of the valve 160 is controlled by a motor 162. The motor 162 may be a stepper motor, a servo motor, or other suitable motor or device that may be used to adjust the position of the valve 160.

Figure 3:
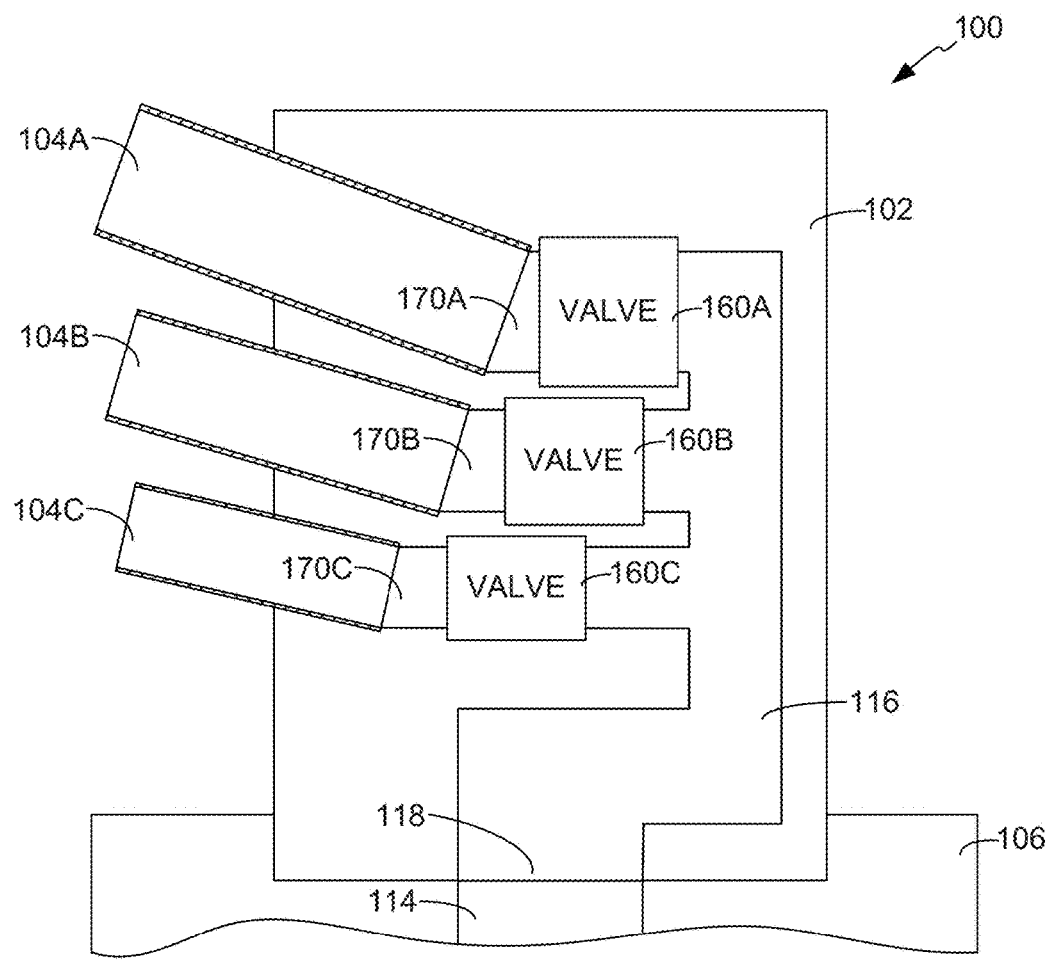
FIG. 3 is a schematic diagram of a nozzle head portion of a rotary sprinkler in accordance with embodiments of the invention.

In one embodiment, the rotary sprinkler 100 includes a plurality of valves 160, as schematically illustrated in FIG. 3. In one embodiment, the plurality of valves 160 are components of a multiplexor valve, rather than separate valves. Also, the valves 160 may also be located in the base 106 rather than the nozzle head 102. Each of the valves 160 may be actuated between opened and closed positions using one or more motors, which are not shown in order to simplify the illustration, responsive to control signals as discussed above. In one embodiment, each of the valves 160 in the sprinkler 100, control a flow of water to one or more of the nozzles 104 of the nozzle head 102. For example, valve 160A can be used to control the flow of water through a fluid flow path 170A connecting the water inlet 108 to the inlet 120 of the nozzle 104A, valve 160B can be used to control the flow of water through the fluid flow path 170B connecting the water inlet 108 to the inlet 120 of the nozzle 104B, and valve 160C can be used to control the flow of water through the fluid flow path 170C connecting the water inlet 108 to the inlet 120 of the nozzle 104C.

The flow of water to each of the nozzles 104 of the sprinkler 100 may be controlled independently of the flow of water to the other nozzles in the rotary sprinkler 100 through the actuation of the valves 160. As a result, individual nozzles may be turned on or off, or the flow rates through the nozzles 104 may be adjusted to a desired level to produce the desired watering areas 132. For instance, while the rotary sprinkler 100 may have the capability of watering out to a 40 foot radial distance from the sprinkler 100, it may be desirable to only water 25 feet from the sprinkler 100. In that case, the one or more nozzles 104 responsible for covering the radial distance from 25 to 40 feet from the sprinkler 100 may be turned off by setting the corresponding valves 160 to the closed position. The flow of water to the remaining nozzles 104 may be reduced, if necessary, by setting the corresponding valves 160 accordingly.

In accordance with another embodiment, the rotary sprinkler 100 includes a sensor 172 that measures a parameter of the water in the fluid flow pathway 114 or 116. In one embodiment, the sensor comprises a pressure sensor that measures a pressure of the fluid in the fluid flow pathway 114 (shown) or 116. In accordance with another embodiment, the sensor 172 is a flow sensor that measures a flow rate of the water traveling through the fluid flow path 114 (shown) or 116. In one embodiment, the sensor 172 produces an output signal 174 that is representative of the parameter measured by the sensor 172.

In one embodiment, the sprinkler 100 includes a controller 164. In one embodiment, the controller 164 represents one or more processors and circuitry used to perform functions described herein. In one embodiment, the processor of the controller 164 is configured to execute sprinkler or watering program instructions stored in memory 166 (e.g., RAM, ROM, flash memory, or other tangible data storage medium) and perform method steps described herein responsive to the execution of the program instructions. Embodiments of the program instructions include the date and time to commence a watering operation, the duration of a watering operation, valve settings, and other information.

In one embodiment, the program instructions comprise valve settings and the controller 164 controls the one or more valves 160 in response to the valve settings. In one embodiment, the valve settings for each of the one or more valves 160 map a desired water flow rate through the valve 160 to a specific valve position. In one embodiment, this flow rate mapping is provided for a series of pressures. For example, when the inlet pressure is 40 psi and the desired input flow rate is 9 feet per second, the mapping will identify a valve position, which is included in the program instructions stored in the memory 166. The valve settings may be dynamically set by the controller 164 based on the output signal 174 (flow rate or pressure) and a predefined desired water flow rate through the valve 160. Accordingly, the controller 164 may adjust the flow of the water through the sprinkler 100 responsive to the execution of program instructions stored in the memory 166.

In one embodiment, the sprinkler program instructions include valve setting instructions that are dependent upon the angular position of the nozzles 104 about the axis 126 relative to a reference. This allows for the generation of non-circular watering patterns by modifying the distance the discharged streams 130 travel from the sprinkler 100. As a result, the sprinkler 100 can produce watering patterns that avoid targets that are within the range of the sprinkler 100 that should not be watered.

In one embodiment, the sprinkler program instructions include rotation speed settings that set the rotational speed of the nozzle head 102. Execution of the program instructions by the controller 164 generate control signals to the motor 129 based on the rotation speed settings that are used to control the motor 129. In one embodiment, the rotation speed settings define a constant rotational velocity for the nozzle head 102. In accordance with another embodiment, the rotation speed settings are dependent upon the angular position of the nozzle head 102 about the axis 126 relative to a reference. Thus, in one embodiment, the executed program instructions generate control signals to the motor 129 that cause the rotational speed of the nozzle head 102 to vary depending on its angular position. This allows for control of the amount of water that is delivered to certain angular sections of the watering pattern generated by the sprinkler. For instance, while the nozzles deliver a continuous amount of water to their respective watering areas 132, the nozzle head 102 may be rotated slower to deliver more water to an angular section of the watering pattern, or faster to deliver less water to an angular section of the watering pattern. This angular speed control of the nozzle head 102 may also be combined with the control of the positions of the one or more valves in each sprinkler 100 to control the amount of water that is delivered by the sprinkler 100.

In one embodiment, the method steps comprise driving the rotation of the nozzle head 102 through the control of the motor 129 responsive to program instructions stored in the memory 166.

In one embodiment, the method steps comprise receiving the output signal 174 from the sensor. In one embodiment, the method steps comprise processing the output signal 174 from the sensor to produce a value indicative of the measured parameter. In one embodiment, the method steps comprise communicating the output signal 174 or the corresponding value to a remote system, such as a system controller.

In one embodiment, the controller 164 is configured to receive control signals from a system controller located remotely from the sprinkler 100, and process the control signals to perform method steps described herein, such as setting the positions of the one or more valves 160, rotating the nozzle head 102, communicating information, acknowledging communications, and other method steps. In one embodiment, the controller 164 relays the output signal 174 or a value represented by the output signal 174 to the system controller using either a wired or wireless communication link.

In one embodiment, the sprinkler 100 includes a power supply 175, such as a battery, a capacitor, a solar cell or other source of electrical energy, that provides power to the processor of the controller 164, the motor 129, the motor 162, the sensor 172 and/or other component of the sprinkler 100 requiring electrical energy. In one embodiment, the power supply 175 is a rechargeable power supply, which may be recharged by signals received over a control line 177 or other wired connection, such as from the system controller described below.

In accordance with another embodiment, the rotary sprinkler 100 includes a pressure regulator 176 that is configured to regulate a pressure of the water in the fluid flow paths 114 and/or 116. In one embodiment, the pressure regulator 176 is configured to maintain a pressure of the water in at least the fluid flow path 116 below a maximum pressure, such as 40 psi.

Figure 4:
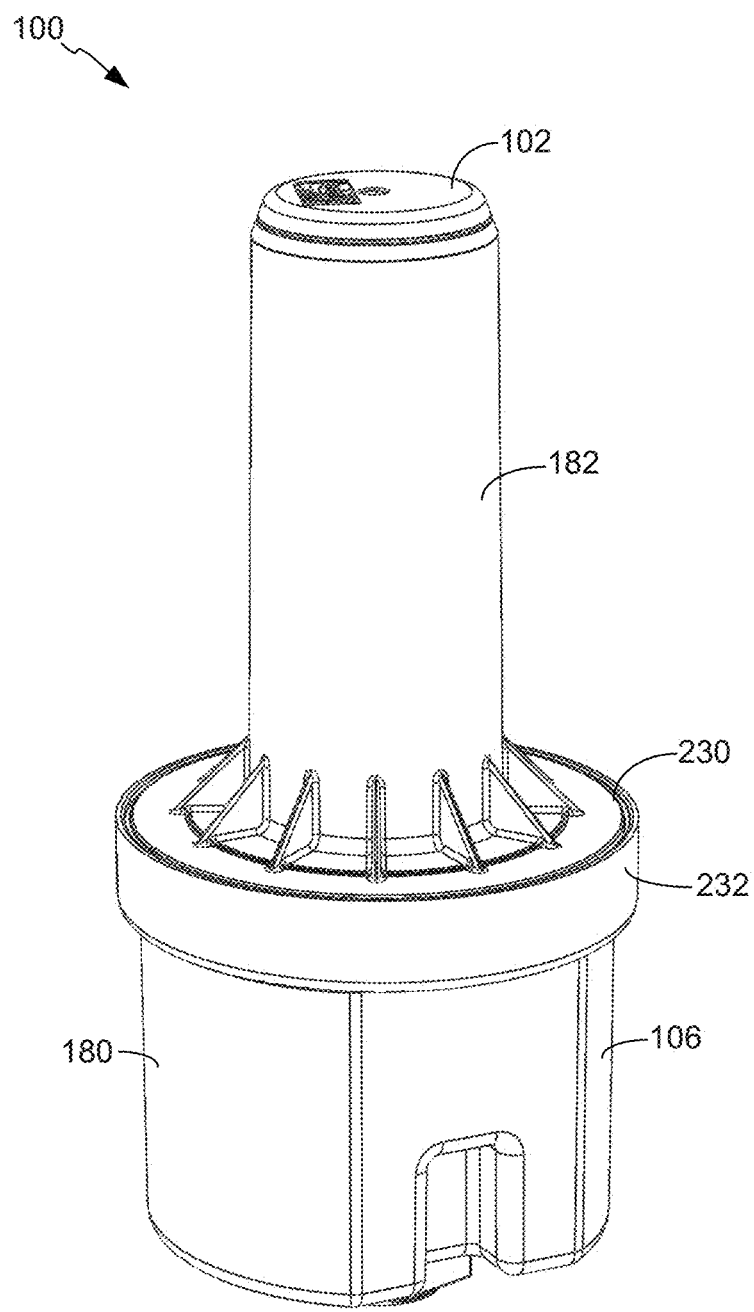
FIGS. 4 and 5 are perspective views of the rotary sprinkler formed in accordance with embodiments of the invention with a nozzle head in lowered and raised positions, respectively.
Figure 5:
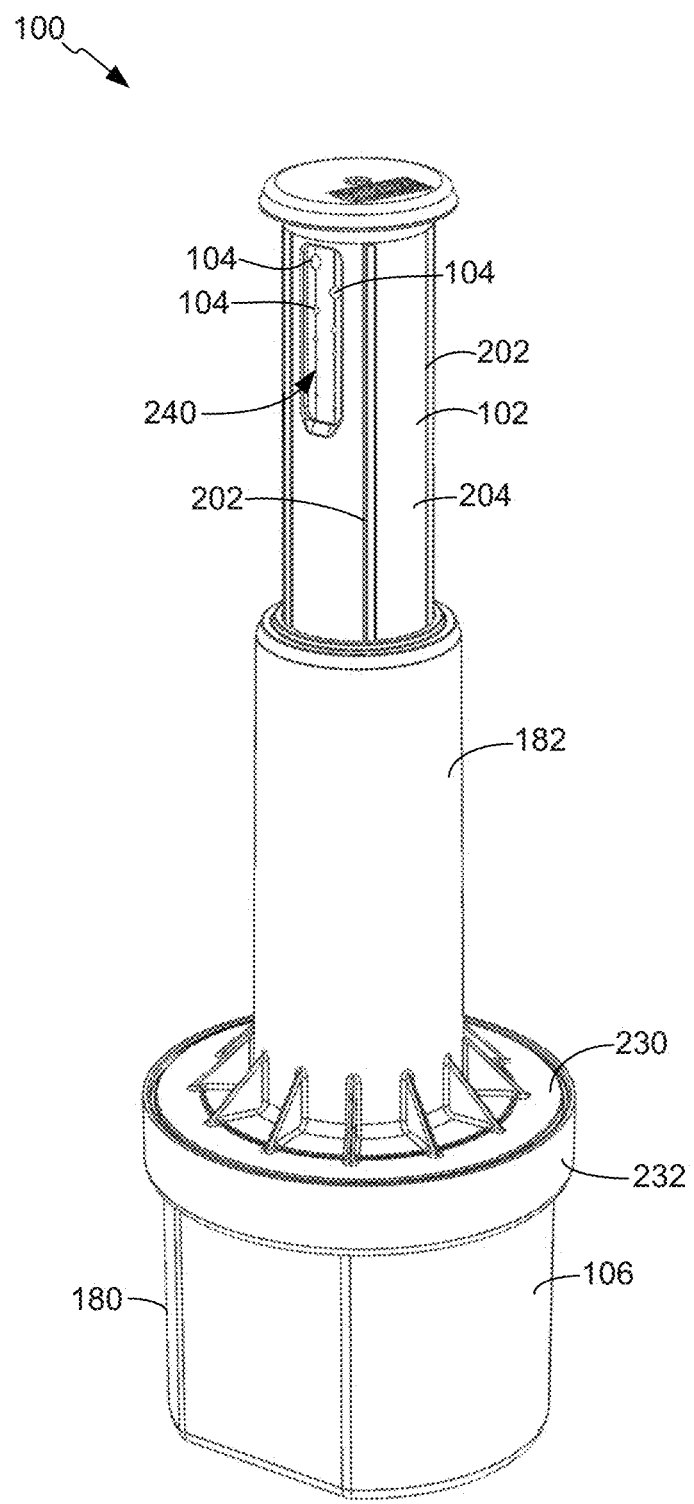

A specific example of an in-ground version of the rotary sprinkler 100 will be described with reference to FIGS. 4-9. FIGS. 4 and 5 are perspective views of the rotary sprinkler 100 depicting the nozzle head 102 in lowered and raised positions, respectively. In one embodiment, the base 106 comprises a lower container 180 and a pedestal 182 that extends above the container 180. The nozzle head 102 is received within the pedestal 182 when in the lowered position (FIG. 4) and extends to the raised position (FIG. 5) in response to water pressure applied to the inlet 118 of the nozzle head 102.

Figure 6:
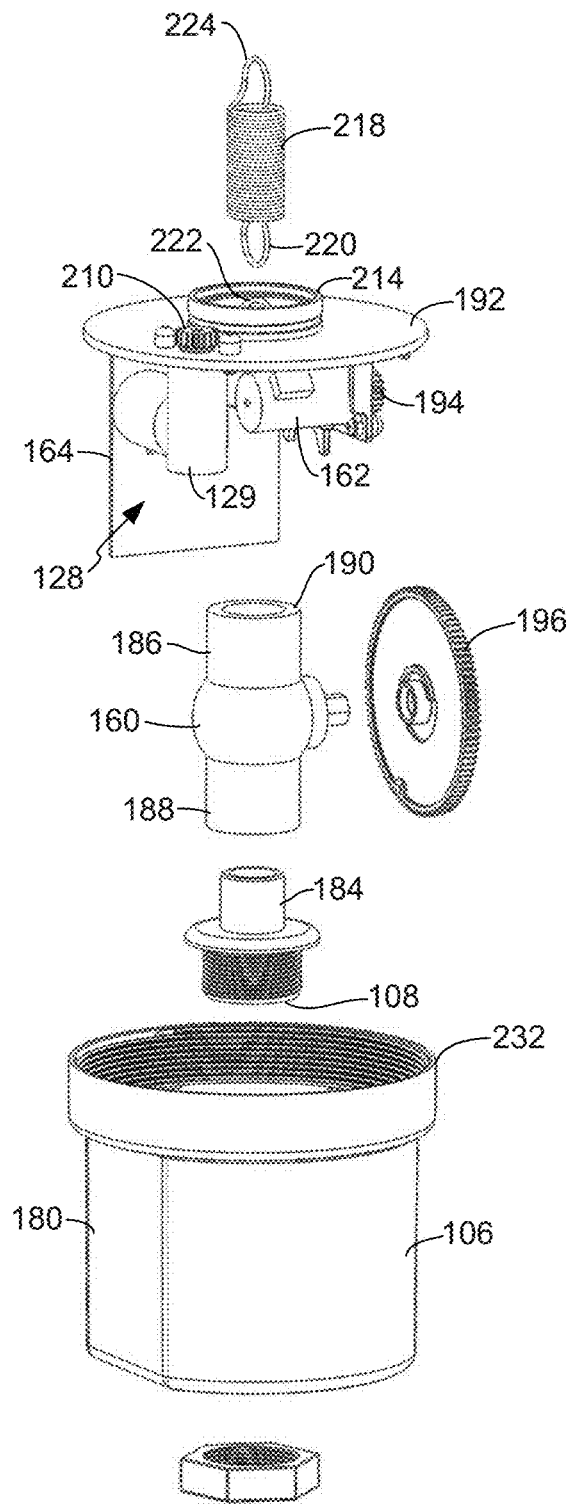
FIGS. 6 and 7 are exploded perspective views of components contained within a sprinkler base in accordance with embodiments of the invention.
Figure 7:
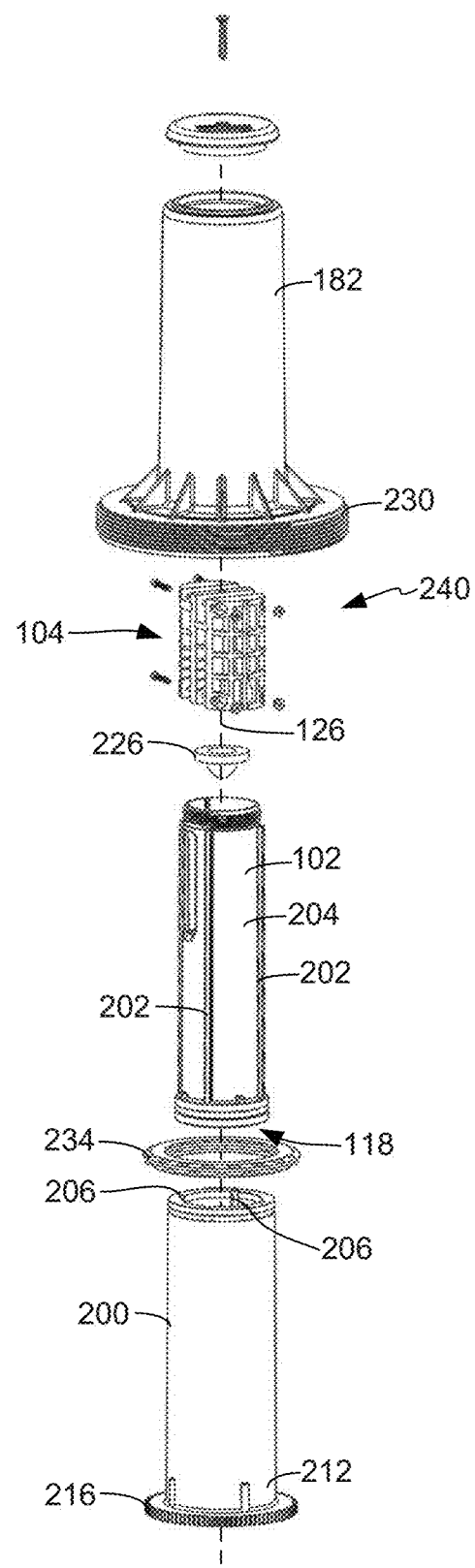

FIG. 6 is an exploded perspective view of the components contained within the container 180 of the base 106. FIG. 7 is an exploded perspective view of the components contained or supported by the pedestal 182. The fluid flow path 114 extends through a pipe fitting 184 that may be coupled to a water supply line 110 (FIG. 1) and defines the water inlet 108. The fluid flow path 114 also extends through a tubing section 186 having a proximal end 188 that attaches to the pipe fitting 184 and a distal end 190 that extends through a cover 192.

In one embodiment, the tubing section 186 includes a valve 160 that is adapted to control the flow of water through the tubing section 186. In one embodiment, a motor 162 drives the valve 160 between the closed, intermediary and fully opened positions through gears 194 and 196.

In one embodiment, the nozzle head 102 is received within a rotatable support 200, which in turn is received within the pedestal 182. The nozzle head 102 is allowed to telescope out of the rotatable support 200 from the lowered position (FIG. 4) to the raised position (FIG. 5) in response to the application of water pressure at the inlet 118 of the nozzle head 102. In one embodiment, the nozzle head 102 includes protrusions 202 that extend from the exterior surface 204 and are generally aligned with the vertical axis 126. The protrusions 202 are received within vertical slots 206 formed in the interior wall of the rotatable support 200. The engagement of the protrusions 202 of the nozzle head 102 with the slots 206 of the rotatable support 200 causes the nozzle head 102 to rotate along with rotation of the rotatable support 200 about the vertical axis 126.

In one embodiment, the sprinkler 100 comprises a drive mechanism 128 that is contained within the container 180. In one embodiment, the drive mechanism 128 comprises a motor 129 that drives rotation of a gear 210 that is supported by the cover 192. A bottom end 212 of the rotatable support 200 receives a cylindrical protrusion 214 and includes a gear 216. The motor 129 of the drive mechanism 128 rotates the rotatable support 200 about the axis 126 using the gears 210 and 216, which in turn drives the rotation of the nozzle head 102 relative to the pedestal 182 and the container 180 of the base 106.

A spring 218 has a proximal end 220 that is attached to a hook 222 on the cover 192 and a distal end 224 that is attached to a structure supported within the nozzle head 102. The spring 218 maintains the nozzle head 102 in the lowered position when there is insufficient water pressure at the inlet 118, and allows the nozzle head 102 to extend to the raised position under sufficient water pressure at the inlet 118.

In one embodiment, a filter screen 226, shown in FIG. 7, is located within the flow path 116 of the nozzle head 102. Alternatively, the filter screen may be located in the flow path 114 of the base 106.

In one embodiment, the rotary sprinkler 100 includes a controller 164 that is contained within the container 180. In one embodiment, the controller 164 operates to control the motor 162 and the positions of the valve 160. In one embodiment, the sprinkler 100 includes a sensor that detects the positions of the valve 160. One exemplary sensor that can be used to carry out this function is a Hall effect sensor that detects a magnetic field of a magnet that is attached to the gear 196, for example.

In one embodiment, the controller 164 controls the motor 129 of the drive mechanism 128 and the rotation of the nozzle head 102. In one embodiment, the sprinkler 100 includes a sensor that detects the angular position of the nozzle head relative to the base 106. One exemplary sensor capable of performing this function is a Hall effect sensor that can detect the magnetic field of a magnet that is attached to the rotatable support 200, the nozzle head 102, or the gear 216 to detect the angular position of the nozzle head 102 relative to the base 106, for example.

In one embodiment, the controller 164 is configured to receive and process control signals from a system controller located remotely from the sprinkler 100. The control signals received from the system controller may be provided either through a wired connection or wirelessly in accordance with conventional techniques. The controller 164 may perform method steps responsive to the control signals, as discussed above.

In one embodiment, the container 180 includes a sealed compartment, in which the electronics of the sprinkler 100 are housed. In one embodiment, the pedestal 182 includes a threaded base 230 which may be screwed on to a threaded opening 232 of the container 180. A seal 234 is positioned between the threaded base 230 and the container 180 to prevent water from entering the compartment containing the electronics.

Figure 8:
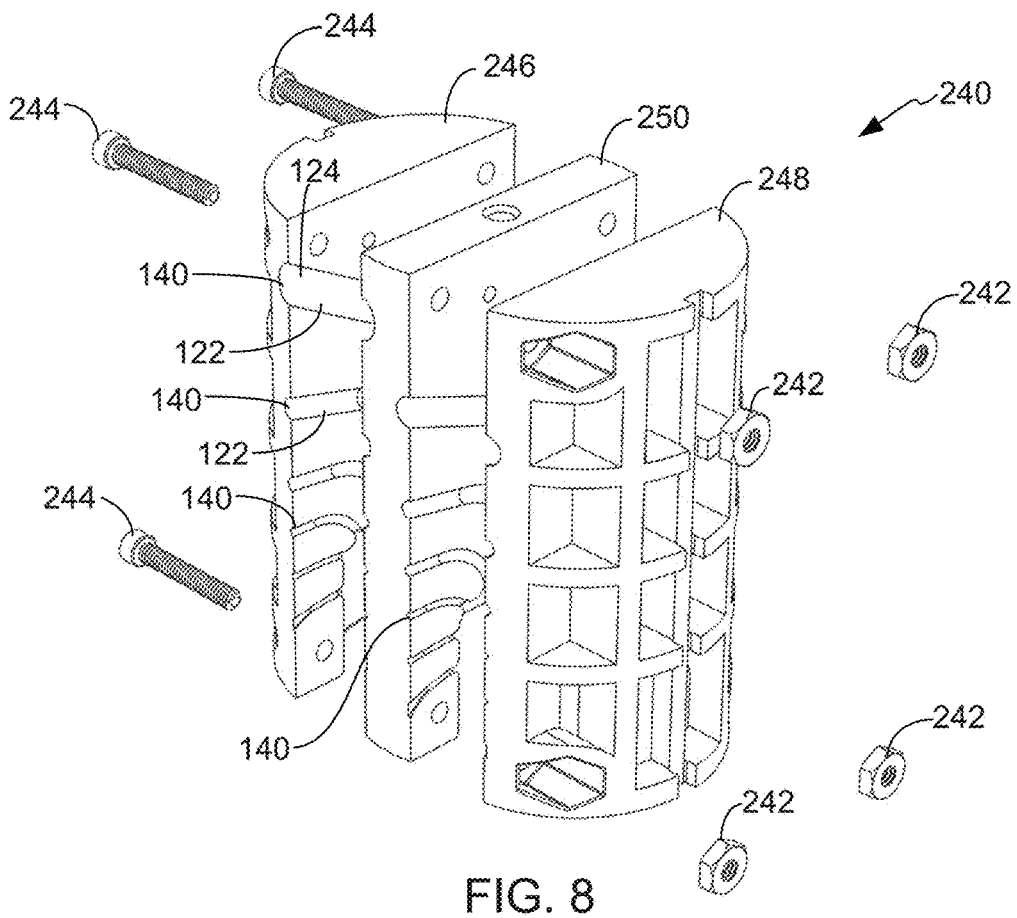
FIG. 8 is an exploded perspective view of the nozzle assembly in accordance with embodiments of the invention.

The plurality of nozzles 104 are supported by the nozzle head 102. In one embodiment, the nozzles 104 are formed in a nozzle assembly 240. The nozzle assembly 240 is secured to the nozzle head 102 such that the nozzle assembly 240 rotates with rotation of the nozzle head 102. FIG. 8 is an exploded perspective view of the nozzle assembly 240 in accordance with embodiments of the invention. The nozzle assembly 240 may comprise two or more components depending on the number of nozzles 104. Thus, while the illustrated embodiment of the nozzle assembly 240 includes three components that align to form twelve nozzles 104, the nozzle assembly 240 may include two halves that form two or more nozzles 104. In one embodiment, the components forming the nozzle assembly 240 are secured together using nuts 242 and bolts 244. Alternatively, the components forming the nozzle assembly 240 may be connected using an adhesive, by welding the components together, or other suitable technique. Further, the nozzle assembly 240 may also be molded as a single unitary component.

In one embodiment, the nozzle assemble 240 comprises end components 246 and 248 and a central component 250. Each end component 246 and 248 includes one half of the fluid pathways 122 of each of the nozzles 104. The other half of the fluid pathways 122 of the nozzles 104 are formed by the central component 250. When the components 246, 248 and 250 are assembled, each half of the fluid pathway 122 of each nozzle 104 is aligned with its corresponding half fluid pathway 122 to form the full nozzle 104.

Figure 9:
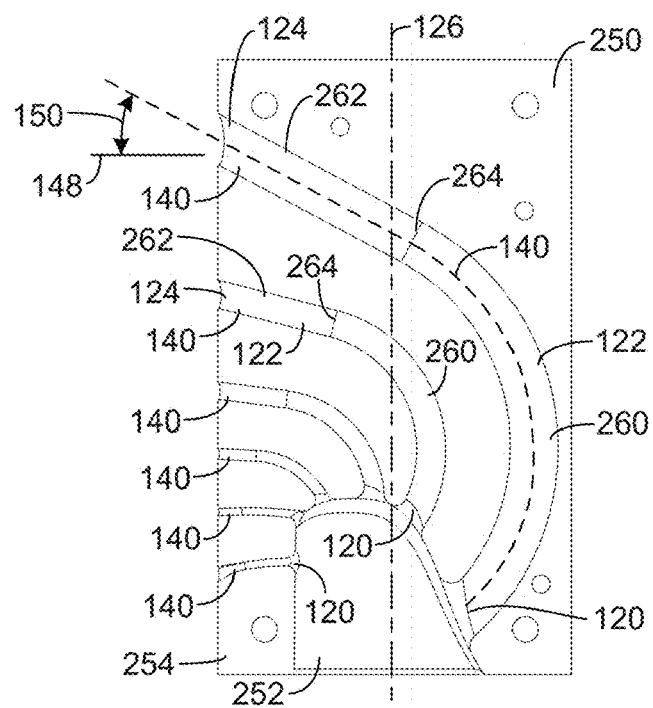
FIG. 9 is a side cross-sectional view of a set of the nozzles formed in accordance with embodiments of the invention.

FIG. 9 is a side view of the central component 250 of the nozzle assembly 240 and, therefore, a cross-sectional view of one set of the nozzles 104. As shown in FIG. 9, the inlets 120 of each of the nozzles 104 open to a cavity 252 at the base 254 of the nozzle assembly 240. Water received at the inlet 118 of the nozzle head 102 travels through the nozzle head 102 to the cavity 252 where it is provided to inlets 120 of the nozzles 104.

In one embodiment, one or more of the nozzles 104 includes a curved section 260 and a straight section 262. In one embodiment, the curved section 260 extends from the inlet 120 to a location 264 between the inlet 120 and the outlet 124. The straight section 262 extends from the location 264 to the outlet 124.

Figure 10:
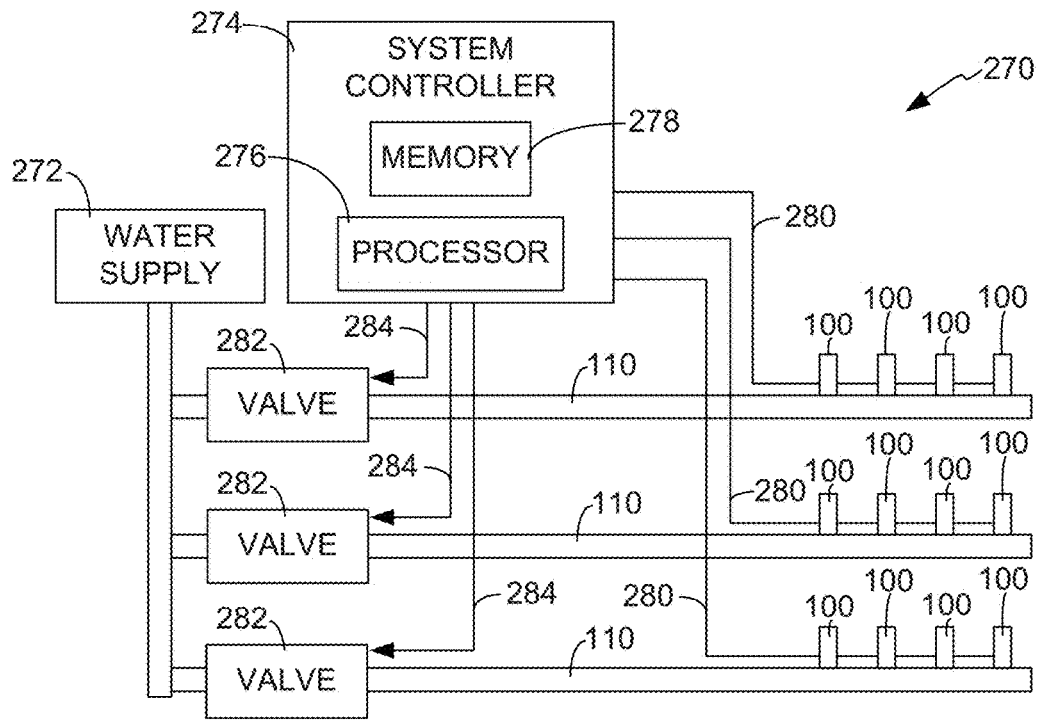
FIG. 10 is a simplified diagram of a sprinkler system in accordance with embodiments of the invention.

FIG. 10 is a simplified diagram of a sprinkler system 270 in accordance with embodiments of the invention. The sprinkler system 270 generally includes a plurality of the rotary sprinklers 100 formed in accordance with embodiments of the invention. Each of the sprinklers 100 are coupled to a pressurized water supply 272, such as a household water supply, a pumped water supply, or other convention water supply. In one embodiment, the system comprises a system controller 274 comprising at least one processor 276 and memory 278 (e.g., RAM, ROM, flash memory, or other tangible data storage medium). In one embodiment, the memory 278 contains program instructions that are executable by the processor to perform method steps described herein.

In one embodiment, the system controller 274 communicates with each of the sprinklers 100 over one or more wired or wireless communication links represented by lines 280 formed in accordance with standard communication protocols. In one embodiment, the control signals provided over the communication links 280 are generated responsive to the execution of the program instructions in the memory 278 by the processor 276. In one embodiment, the control signals are communicated over the communication links 280 to controller 164 of the rotary sprinklers 100. The controllers 164 are configured to operate the sprinklers 100 (e.g., set valve positions, rotate the nozzle head, etc.), communicate information (e.g., sensor information) back to the system controller 274, or perform other function responsive to the control signals. Alternatively, when the rotary sprinklers 100 do not include a controller 164, the control signals may be communicated over the communication links 280 directly to the relevant components of the sprinklers 100, such as the motor 162 or the motor 129, for example. Also, the outputs 174 from the sensors 172 of the rotary sprinklers 100 may also be communicated over the communication links 280 to the system controller 274.

In one embodiment, the control signals comprise valve settings for setting the positions of the one or more valves 160 in each of the controllers 100. When the sprinklers 100 include the one or more valves 160, it is not necessary to include separate valves 282 for each of the water lines 110 feeding different groups of the rotary sprinklers 100. Rather, the system controller 274 may individually activate any one of the rotary sprinklers 100 through the control signals. Thus, the system controller 274 is capable of activating and deactivating individual rotary sprinklers 100 based on the execution of the watering program instructions stored in memory 278.

In one embodiment, the system 270 includes one or more valves 282 that operate to control the flow of water along one or more of the water lines 110. In accordance with this embodiment, the system controller 274 is configured to control the positioning of the valves 282 using an appropriate control signal over a communication link 284 in accordance with conventional techniques. In accordance with this embodiment, it may not be necessary for each of the rotary sprinklers 100 to include their own internal valves 160. However, the inclusion of the valves 160 in the rotary sprinklers 100 allow the system controller 274 to activate individual sprinklers 100 within each group of sprinklers 100 fed by the corresponding valve 282.

In one embodiment, the memory 278 comprises a series of valve settings for each of the valves 160 of the sprinklers 100 that map a desired water flow rate through the valve 160 to a valve position, as described above. The valve settings may be dynamically set by the controller 274 based on the output signal 174 (flow rate or pressure) from the sensor 172 (or a sensor in the water line 110) and a predefined desired water flow rate through the valve 160. Alternatively, when the pressure in the system is regulated, such as by pressure regulator 176, the valve settings may be fixed in the watering program stored in the memory 278.

Figure 11:
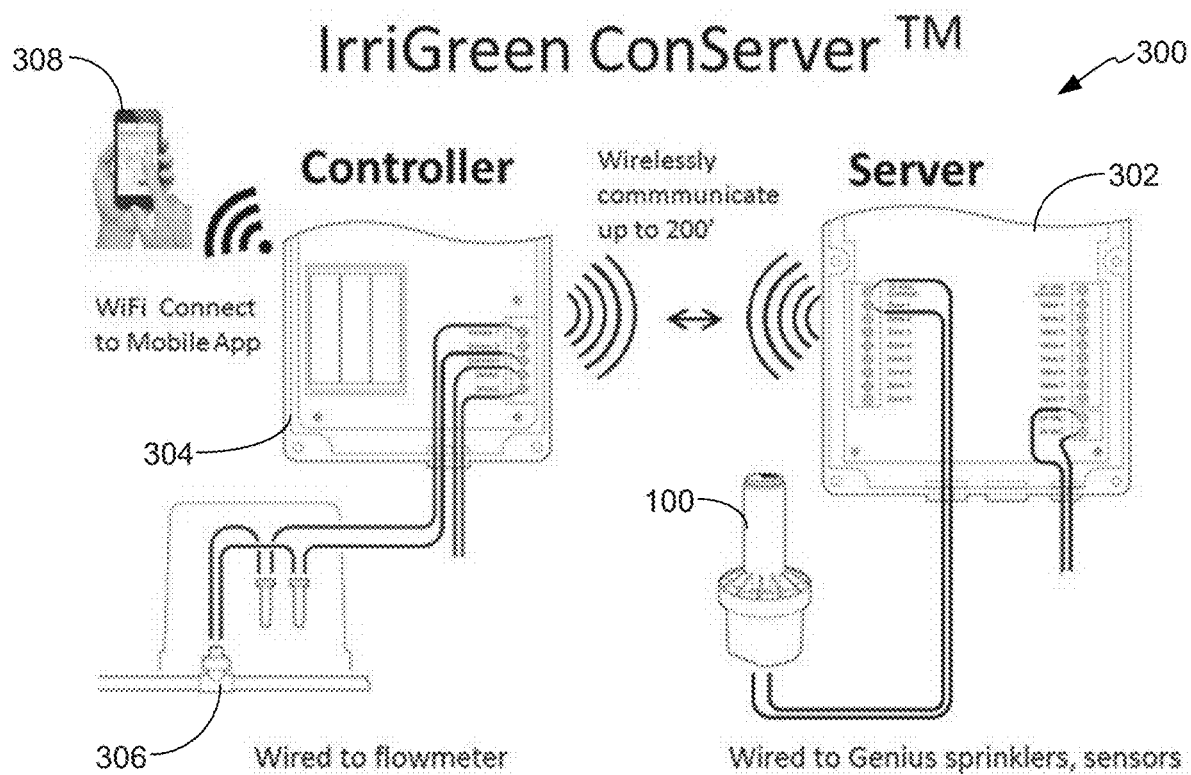
FIG. 11 is an exemplary irrigation system in accordance with embodiments of the invention.

Some embodiments of the invention are directed to an irrigation system formed in accordance with one or more embodiments described herein. FIG. 11 is an exemplary irrigation system 300 in accordance with embodiments of the invention. In some embodiments, the irrigation system includes a controller or computer server 300, which may operate in accordance with one or more embodiments of the system controller 278 (FIG. 10). In some embodiments, the system 300 also includes one or more wireless networks or other suitable data communication links, one or more computerized sprinklers 100 with a digitally controlled valve or valves 160 connected through a wired or wireless communication link to the server 300, one or more controllers 304 with Wi-Fi, which my use another wireless network or suitable data communication link, and/or one or more flow sensors 306 or 172 (FIG. 1) connected by wireless or wired to the controller 304 or server 302, for example.

In some embodiments, the sprinklers 100 are powered through a wired connection, or through batteries, which may be rechargeable using solar power or through a generator powered by the flow of water through the sprinkler 100. In some embodiments, each sprinkler 100 generally provides a uniform incremental amount of precipitation to the soil for each revolution and can also adjust the incremental amount of precipitation for a given arc portion of a revolution. In some embodiments, the server 302 and the controller 304 are combined into a single unit, and in another embodiment they are separate units, which can create more flexibility.

As mentioned above, it is desirable that the irrigation system 300 be properly calibrated to provide the desired watering pattern including the throw distance the watering stream travels from each sprinkler head 100 over various angular portions of a revolution. Furthermore, it has been determined that a consistent pressure and flow are desirable to maintain efficiency where efficiency is defined by the system 300 sing the desired amount of water. Too much pressure causes too much flow resulting in over-watering and a throw distance that is too long, and too little pressure causes too little flow resulting in under-watering and a throw distance that is too short.

An installation contractor may use a pressure gauge to measure static pressure, but that does not account for pressure loss in pipes and fittings under flow conditions in the field. The contractor can also turn on the sprinkler and measure the distance of the streams which are reflective of the flow conditions, but this has proven to be complicated and slows down the installation. Embodiments of the invention provide a solution for automatically finding the effective pressure for a particular irrigation sprinkler and setting the sprinkler distance (i.e., throw distance) for angular portions of a revolution at a particular installation site.

In some embodiments, the flow rate through a given sprinkler 100 is proportional to the stream throw distance 134 (FIG. 2). In some embodiments, a first empirically derived formula is used that correlates the water flow rate (e.g., gallons per minute) through the sprinkler 100 to the throw distance 134 over a range of distances. This first formula is specific (i.e., unique) to the sprinkler design. In one exemplary embodiment, the first formula for distance is as provided in Equation 2.

$$d = GPM \times s + k \quad \text{Eq. 2}$$

In Equation 2, d is the distance 134, GPM is the water flow rate, s is the slope, and k is the intercept. In another embodiment the equation is used to determine two distances, from the flow sensor (306 or 172), that are spaced apart so as to limit positioning error between the two points. In one embodiment, the first distance is approximately 15 feet and the second distance is approximately 20 feet. These distances are proportional to pressure, and are used, in accordance with embodiments of the invention, to estimate an effective pressure for a sprinkler.

For example, in some embodiments, the computer controlled valve 160 inside the sprinkler is gradually opened under direction of the server 302 or other suitable controller, such as controller 164 (FIG. 1) in order to record the valve opening at a given distance, such as 15 feet. That is the valve opening is adjusted until the flow sensor (e.g., 172 or 306), which measures a flow rate of the water through the sprinkler 100, measures a flow rate that corresponds to the predetermined first distance, which in this example is 15 feet. The valve 172 is then adjusted to achieve the second throw distance (e.g., 20 feet). In some embodiments, this adjustment to the valve 160 is a predetermined fixed amount that may achieve the second throw distance, where the actual distance depends on working pressure and flow rate. For instance, if the static water pressure is 75 PSI the resulting change in distance is 22 feet under working water pressure conditions and for static water pressure of 40 PSI the resulting distance is 19 feet under working water pressure conditions where these distances are determined by flow rate. Static water pressures of 40-75 PSI are generally a practical operating range for a residential irrigation system, but other pressure ranges may be used.

In another embodiment, a specific tangential equation (e.g., f(x, y)) is used to correlate valve opening and distance for a specific sprinkler, nozzle design and effective pressure. In another embodiment the difference in distance as measured by the flow sensor is applied to the tangential equation repeatedly for a range of effective pressures in order to find the closest match. In another embodiment the matching effective pressure and the first and second distances are applied to the tangential equation to compute an absolute distance offset based on valve opening for the sprinkler 100. In another embodiment a polynomial equation is used to correlate valve opening and distance, such as d=f(p,o), where d is the distance (e.g., feet), p is the effective pressure (e.g., PSIG), and o is the valve opening (e.g., percent of valve opening). In yet another embodiment the tangential and polynomial equations are combined.

As mentioned above, there is a need to irrigate efficiently to save water. By using a computerized sprinkler 100 with multiple streams 130 of water instead of water spray, one is able to use one sprinkler in the center of a landscape and program it to cover the landscape shape. In contrast conventional non-computerized sprinklers use multiple sprays around the edges of the landscape that overlap and thereby waste water. In order to accurately water the landscape shape the effective water supply pressure and water flow rate are needed by the server that controls the computerized sprinkler in order to calculate valve opening for a desired water stream distance 134. The water stream distance or flow distance is the distance from the computerized sprinkler to the leading edge of the farthest water stream falling on the ground, as described with reference to FIG. 2.

Drops in water pressure and flow rate are caused by pipe length, reduced pipe diameters, pipe fittings, increases in sprinkler elevation compared to water supply, pump variation and variation in city water supplies. One objective of embodiments of the invention is to automatically compute an effective working pressure for a given sprinkler 100 in a given installation without the need to use a pressure gauge, such as a pressure gauge at the sprinkler. Knowing the effective working pressure for a given computerized sprinkler 100 allows for more uniform, precision and reproducible control over the water stream distance at any point within the landscape shape of the watering zone. Another objective of embodiments of the invention is to automatically compute a distance offset for a given sprinkler that provides for precise changes in water stream distance. Conventional systems do not require the same precision because they overlap one another and since they use water spray instead of multiple water streams, the variation in distance from pressure was not considered. This automated method of setting effective working pressure and distance offset are therefore unique to the new technology of computerized sprinklers 100, such as that described in the sprinkler application.

Figure 12:
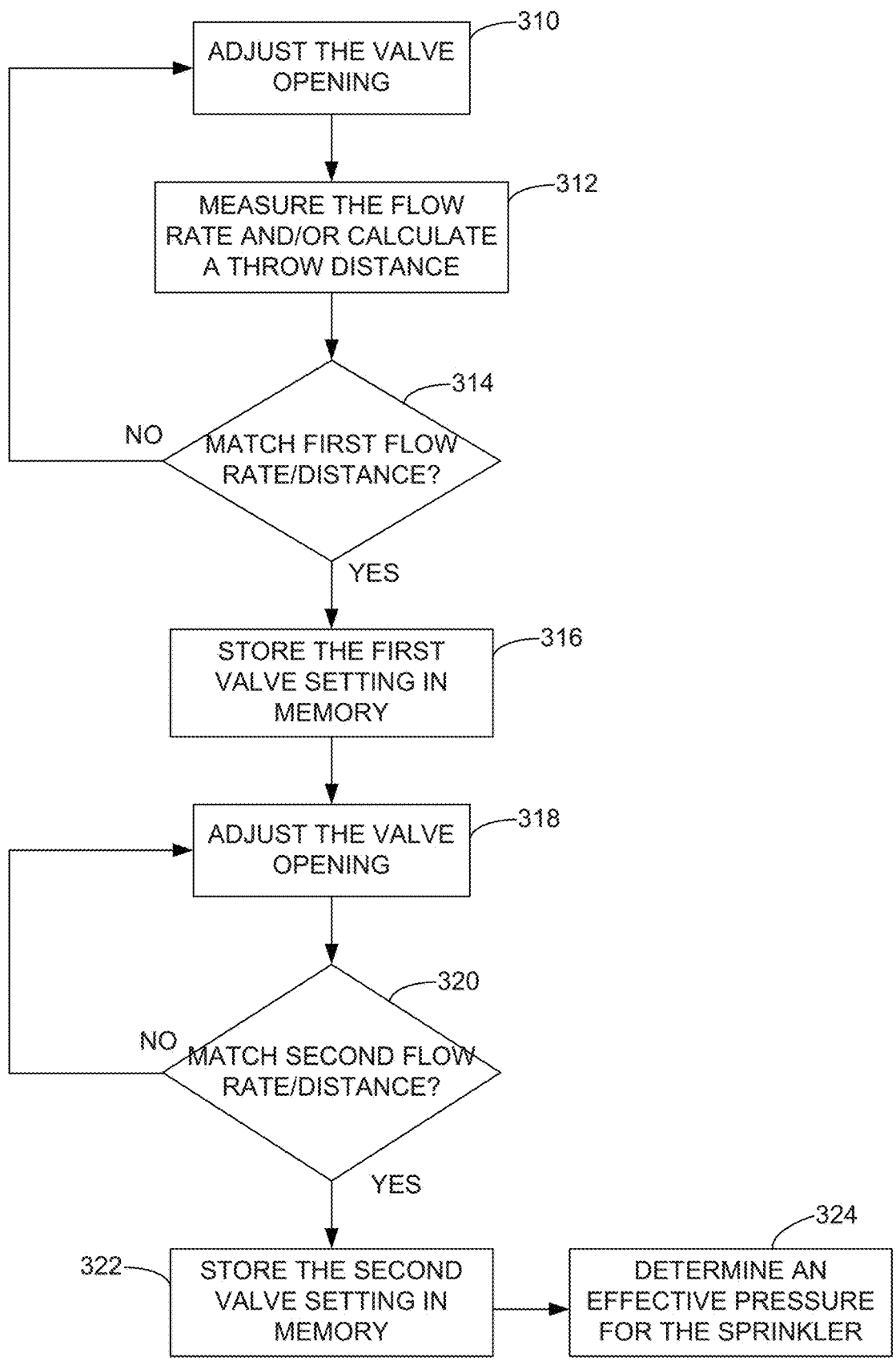
FIG. 12 is a flowchart illustrating a method of calibrating a sprinkler, in accordance with embodiments of the invention.

FIG. 12 is a flowchart illustrating a method of calibrating a sprinkler 100, in accordance with embodiments of the invention. In some embodiments, a user of the irrigation system uses an application on a computing device 308 (e.g., a mobile phone, laptop, etc.) to select an automatic calibration routine for a selected sprinkler 100. In some embodiments, the selection of the automatic calibration routine triggers a communication to the controller 304 through a Wi-Fi or other communication link to the computing device 308. In some embodiments, the controller opens a wireless communication link (or other communication link) to the server 302 (if necessary), with which the one or more sprinklers are configured to communicate through a wired or wireless communication link. In some embodiments, the controller 304 directs the server 302 to activate a selected sprinkler 100 by adjusting the opening of the corresponding vale 160, such as initially to a minimum valve opening, as indicated at step 310 of the method. In some embodiments, the controller 304 starts reading or processing water flow rate signals from the flow sensor 172 or 306 that measures the water flow to the sprinkler. In some embodiments, the flow sensor is located at the sprinkler, such as near the input port to the sprinkler, or within the sprinkler, as indicated by sensor 172 in FIG. 1. In some embodiments, the system includes a flow sensor at the inlet to the entire system. For example, as the sprinklers include valves, in some embodiments, the sprinklers 100 of the system are connected by conduit 110 in series and the flow sensor is located at or near the inlet to the conduit or upstream of the first sprinkler in the series, such as indicated by sensor 306 in FIG. 11. In some embodiments, such a single flow sensor is used to determine the effective pressure for each of the sprinklers 100.

In some embodiments, the flow rate signals output from the flow sensor 172 or 306 are delivered to the controller 304 through a wireless or wired connection. The water flow rate and water stream distance are proportional to each other. In some embodiments, the relationship between the water flow rate and the water stream or throw distance is empirically determined and is in accordance with Equation 1. In some embodiments, the water stream distance 134 is a function of valve opening and the water pressure, as mentioned above. That is d=f(p,o)), where d is the distance in feet, p is the pressure in PSIG, o is the valve opening in degrees and function f is a tangential equation, a polynomial equation, a linear equation or a combination thereof.

In another embodiment, the water stream distance is a linear function of water flow rate, as indicated in Equation 3.

$$d=f(r)$$ Eq. 3

In Equation 3, d is the distance in feet, r is the water flow rate in GPM, and the function f is a linear equation like Equation 1 discussed above.

The controller 304 reads the sensed water flow rate. In some embodiments, the water flow rate is compared to a first water flow rate corresponding to a first distance, or the controller may compute a throw distance for the sprinkler that is based on the measured flow rate, and compare the computed throw distance to a first distance, as indicated at 312. The computed stream distance is then compared to a first flow rate or the first throw distance, as indicated at 314. If the computed stream distance doesn't match the predetermined first flow rate/distance (e.g., is not within a margin of error of the first flow rate/distance such as +/−5%), then the method returns to step 310 where the controller 304 directs the server 302 to increase the opening of the valve 160. This is successively done until the measured flow rate or computed throw distance reaches the desired first flow rate/distance. The resultant valve opening or setting is recorded or stored in memory of the system, such as memory 278 (FIG. 10) or other suitable memory, as a first valve setting at step 316. In some embodiments, the corresponding first flow rate/distance is also recorded in the memory.

In some embodiments, the method moves to step 108 where the controller directs another adjustment to the opening of the valve 160 to increase the valve opening. In some embodiments, the adjustment made in step 318 is of a predetermined amount (e.g., degrees) that corresponds to a second flow rate/distance. In some embodiments, the adjusting step 318 involves opening the valve 160 until the measured flow rate, as processed by the controller 304, reaches a second flow rate that corresponds to the predetermined second distance, as indicated at step 320. The resultant valve setting is then recorded or stored in the memory as a second valve setting, as indicated at step 322. In some embodiments, the second flow rate and/or second distance are also recorded in the memory.

The effective pressure for the sprinkler 100 is then determined at step 324. In some embodiments, the effective pressure is determined based on the change in the valve setting between the first valve setting and the second valve setting, and the difference between the first and second flow rates. This determination may be made based upon known properties of the valve, such as a relationship between flow rates for the valve for various water pressures and valve openings.

Considering the two functions for distance referenced above we have:

$$d_1=f(r_1)$$

$$d_2=f(r_2)$$

$$d_1=f(p,o_1)$$

$$d_2=f(p,o_2)$$

Where subscript 1 designates set point 1 (i.e., the first flow rate/distance), subscript 2 designates set point 2 (i.e., the second flow rate/distance) and p is the effective working pressure. There is only one value of p that will satisfy these 4 equations.

The calculated effective pressure for the sprinkler 100 is then used by the controller 304 to control the valve 160 for various angular positions of the sprinkler 100 to vary the throw distance 134 as the sprinkler rotates as described above. In some embodiments, the irrigation system 300 includes multiple sprinklers 100, and the method is per-formed for each sprinkler 100. Thus, each sprinkler 100 in the system may have a different effective pressure than other sprinklers 100 in the system 300, due to different pressure drops the water undergoes before reaching the sprinkler.

Embodiments of the method may also include one or more of the following steps.

a) Startup a sprinkler to a minimal water flow condition.

b) Increase the sprinkler valve opening in small increments and measure the water flow rate after a brief time to allow for the water flow sensor readings to stabilize from the incremental change.

c) Repeat b. until a water flow rate is reached that represents the computed water stream distance for the first desired set point and record the computed water stream distance and valve opening.

d) Increase the valve opening a known amount that correlates to a new water flow rate and new computed water stream distance for the second desired set point and record the computed water stream distance and valve opening.

e) Utilize the water stream distance and valve opening recorded in c. and d. to compute an effective working pressure based on the tangential/polynomial equation d=f(p, o) referenced above. In one embodiment, the above equation is tested for pressures ranging from 20 PSIG to 100 PSIG until a given PSIG matches computationally for set point 1 and set point 2. This matching PSIG is the effective working pressure for that sprinkler.

f) Utilize the newly calculated effective working pressure and the first and second computed water stream distances recorded in c. and d. with the tangential/polynomial equation d=f(p,o) to compute a distance offset for that sprinkler based on valve opening.

g) Store the effective working pressure and the distance offset in the server or other memory.

h) Retrieve the stored effective working pressures and/or distance offsets for the sprinkler using the controller, and controlling a watering operation using the retrieved working pressures and/or distance offsets using the controller. Although the present invention has been described with reference to preferred embodiments, workers skilled in the art will recognize that changes may be made in form and detail without departing from the spirit and scope of the invention.

What is claimed is:

1. A method of calibrating a sprinkler comprising steps of:
controlling a flow rate of water through a sprinkler including setting a valve opening of a valve;
measuring the flow rate of water using a flow sensor;
adjusting the valve opening;
repeating the controlling, measuring, and adjusting steps a limited number of times;
identifying one of a plurality of pressure-dependent relationships between the flow rate and the valve opening for the valve based on the corresponding measured flow rates and valve openings;
determining a relationship between the valve opening and a throw distance, at which a water stream is discharged from the sprinkler, based on the identified pres sure-dependent relationship and a relationship between the flow rate and the throw distance for the sprinkler; and
controlling the operation of the sprinkler based on the relationship between the valve opening and the throw distance;
wherein determining a relationship between the valve opening and the throw distance comprises measuring a plurality of flow rates and throw distances for a plurality of valve settings.

2. A method of calibrating a sprinkler of an irrigation system comprising:
adjusting a valve setting of a valve of the sprinkler to a first valve setting, in which a water flow rate through the sprinkler reaches a first flow rate and a water stream discharged from the sprinkler reaches a first distance, using a controller;
recording at least the first valve setting in memory of the system using the controller;
adjusting the valve setting to a second valve setting, in which the water flow rate through the sprinkler reaches a second flow rate and a water stream discharged from the sprinkler reaches a second distance using the controller;
recording at least the second valve setting in memory of the system using the controller;
identifying one of a plurality of pressure-dependent relationships between the water flow rate through the sprinkler and the valve opening for the valve based on the first valve setting, the second valve setting, the first flow rate or the first distance, and the second flow rate or the second distance;
determining a first relationship between the flow rate and a throw distance for the sprinkler based on the first and second flow rates and the first and second distances;
determining a second relationship between the valve setting and the throw distance for the sprinkler based on the identified pressure-dependent relationship and the first relationship; and
configuring the sprinkler to operate based on the second relationship.

3. The method according to claim 2, further comprising calculating an effective pressure for the sprinkler based on a change in the valve setting between the first and second valve settings, and the difference between the first and second flow rates, and storing the effective pressure in memory using the controller.

4. The method according to claim 3, further comprising retrieving the stored effective pressure from the memory, and controlling the operation of the sprinkler based on the effective pressure using the controller.

5. An irrigation system comprising:
one or more sprinklers;
a valve associated with each sprinkler and configured to control a water flow through the sprinkler;
a flow sensor associated with each sprinkler and configured to measure a water flow rate through the sprinkler;
at least one controller configured to perform a method of calibrating each of the one or more sprinklers comprising:
adjusting a valve setting of the valve to a first valve setting, in which the water flow rate through the sprinkler reaches a first flow rate and a the water stream discharged from the sprinkler reaches a first distance using the at least one controller;
recording at least the first valve setting in memory of the system using the controller;
adjusting the valve setting to a second valve setting, in which the water flow rate through the sprinkler reaches a second flow rate and a water stream discharged from the sprinkler reaches a second distance using the at least one controller;
recording at least the second valve setting in memory of the system using the at least one controller;
identifying one of a plurality of pressure-dependent relationships between the water flow rate through the sprinkler and the valve opening for the valve based on the first valve setting, the second valve setting, the first flow rate or the first distance, and the second flow rate or the second distance;

determining a first relationship between the flow rate and a throw distance for the sprinkler based on the first and second flow rates and the first and second distances;

determining a second relationship between the valve setting and the throw distance for the sprinkler based on the identified pressure-dependent relationship and the first relationship; and configuring the sprinkler to operate based on the second relationship.

6. The system according to claim 5, wherein the method of calibrating includes controlling each of the sprinklers to perform a controlled watering operation based on the second relationship.

* * * * *